RE 24677
May 20, 1958　　　J. H. MARTINDALE　　　2,835,173
PAPER MACHINERY
Filed March 3, 1955
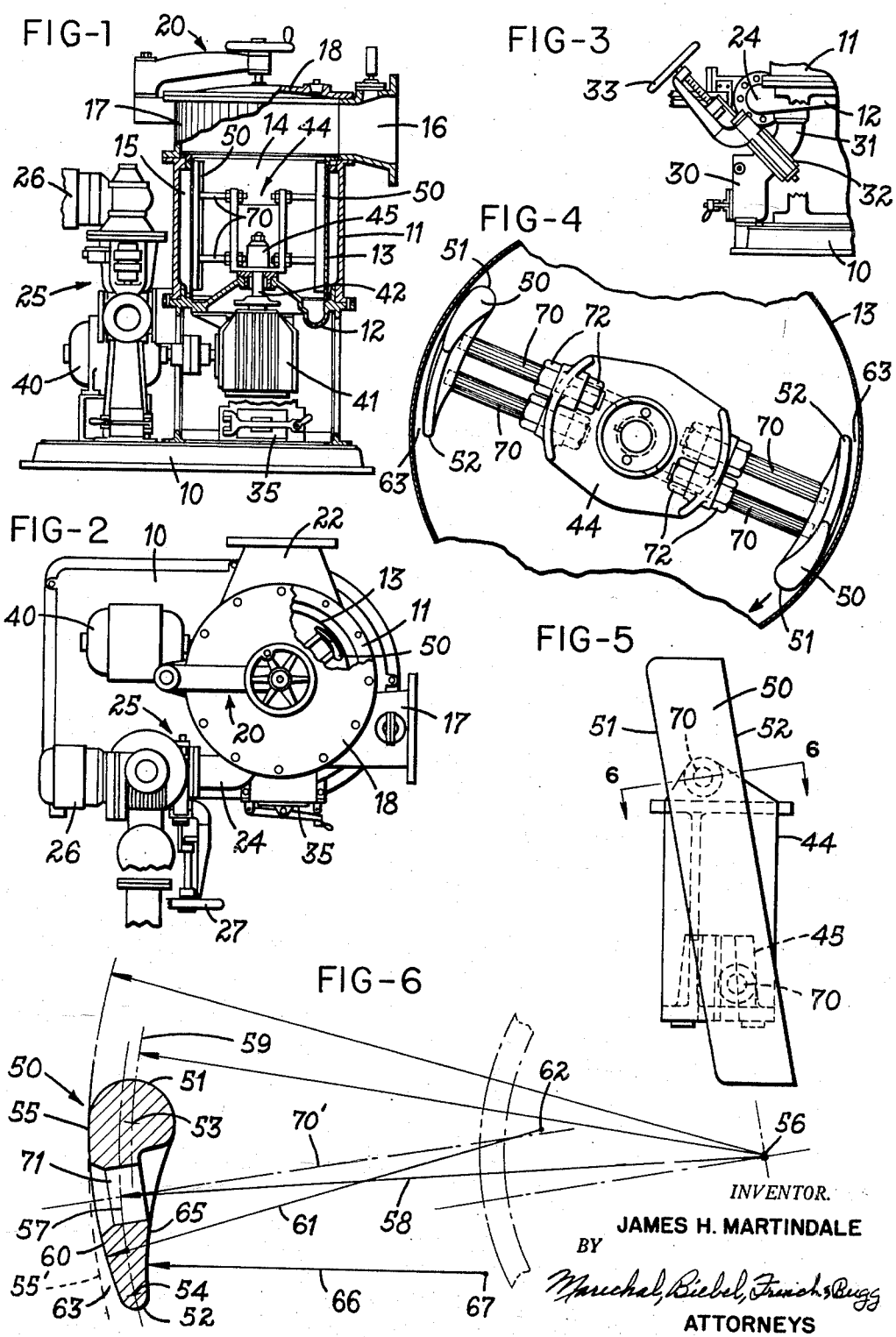
INVENTOR.
JAMES H. MARTINDALE
BY
Marechal, Biebel, French & Bugg
ATTORNEYS

United States Patent Office 2,835,173
Patented May 20, 1958

2,835,173

PAPER MACHINERY

James H. Martindale, Middletown, Ohio, assignor to The Black-Clawson Company, Hamilton, Ohio, a corporation of Ohio Application March 3, 1955, Serial No. 491,831

11 Claims. (Cl. 92—34)

This invention relates to apparatus for screening fibrous material suspended in liquid such as paper making stock and the like.

The invention has special relation to screening apparatus embodying a vertically extending cylindrical perforate screen defining supply and discharge chambers on the inner and outer sides thereof respectively in a closed container and provided with a rotor member which operates in conjunction with the supply side of the screen to keep the screen perforations open and free from solid material tending to cling to the screen surface. Such screening apparatus is shown, for example, in Staege Patent No. 2,347,716 issued May 2, 1944, to the assignee of this application.

Screening apparatus of the above characteristics has been found to be highly satisfactory in operation on a wide variety of types of paper making stock. Some difficulty is encountered, however, in the use of such apparatus for screening stocks of very low freeness such particularly as Glassine, waxing and newsprint stocks where the screen rotor carries scraper members as shown in the above patent which operate in contact with the inner surface of the perforate screen, because there is a tendency for such stocks to be formed into lumps between the scrapers and the screen and to be extruded through the screen as lumps which cause defects in the paper sheet.

It is a primary object of the present invention to provide screening apparatus of the above generally outlined type which will effectively and efficiently screen stocks of low freeness without tending to form lumps or the like.

A further object of the invention is to provide screening apparatus as outlined above incorporating one or more rotating bar members which are arranged in inwardly spaced relation with the perforate screen to avoid compressing action on particles in the stock and each of which is constructed to create a positive pressure wave rotating around the inner surface of the screen to force the stock outwardly through the screen perforations and followed by a negative pressure wave effective to draw particles inwardly away from the screen surface.

Another object of the invention is to provide a bar for use as outlined above in pressure screening apparatus which is of airfoil shape in cross section and which is constructed for mounting and rotation within a vertical cylindrical screen member to produce the desired rotating positive and negative pressure waves effective on the stock within the screening chamber.

It is also an object of the invention to provide screening apparatus as outlined above wherein the rotating bars are helically curved substantially about the rotational axis thereof to cause solid particles drawn in from the screen surface to travel downwardly within the screening chamber for collection and disposal at the bottom of the apparatus.

Additional objects and advantages of the invention will be apparent from the following description, the accompanying drawing and the appended claims.

In the drawing—

Fig. 1 is a front elevational view, partly broken away in vertical section, showing screening apparatus constructed in accordance with the invention;

Fig. 2 is a plan view of the apparatus of Fig. 1 with a portion of the top cover broken away;

Fig. 3 is a fragmentary view looking from right to left in Fig. 1;

Fig. 4 is an enlarged fragmentary view looking downwardly into the screening chamber of the apparatus of Fig. 1;

Fig. 5 is a detail side elevational view of the screen rotor of Fig. 4; and

Fig. 6 is an enlarged somewhat diagrammatic view taken approximately on the line 6—6 of Fig. 5 and showing the specific structural design of one of the screen rotor bars of Figs. 1–5.

Referring to the drawing, which illustrates a preferred embodiment of the invention, the screening apparatus shown in Figs. 1 and 2 is generally of the same construction disclosed in the above Staege patent. It includes a base 10 supporting a main body 11 of cylindrical configuration and its bottom section 12, and the upright cylindrical perforate screen 13 divides the interior of the main body 11 into an inner supply chamber 14 and an outer discharge chamber 15. The stock to be screened enters the supply chamber 14 through a tangentially arranged passage 16 in the inlet head 17 having a removable cover 18 provided with a lifting assembly indicated generally at 20 to facilitate removal thereof for cleaning or other maintenance operations in the interior of the apparatus. The screened stock leaves the chamber 15 by way of a discharge outlet 22 shown as located at the back of the unit.

This screening apparatus operates under pressure at all times, and provision is made for removing the reject material with minimum loss of the desired pressure. A discharge outlet conduit 24 is provided at the bottom of the supply chamber 14, the bottom section 12 having a generally volute portion leading to conduit 24. The conduit 24 in turn leads to a reject valve assembly indicated generally at 25 which is shown as power operated by a motor 26 and also has a hand wheel 27. A junk trap 30 is located on the base 10 below and in communication with the conduit 24 through a connection 31 provided with a valve 32 having a hand wheel 33, and a clean-out door 35 is mounted on the front of this junk trap.

The main drive motor 40 for this screening apparatus is mounted on the base 10 and drives through a transmission 41 to a vertical shaft 42 extending upwardly into the interior of the supply chamber 14. This shaft 42 carries a cage assembly 44 including a hub portion 45 secured to the shaft 42, and the cage 44 in turn carries a plurality of generally vertically arranged bars 50 of special construction and operational properties which are shown in detail in Figs. 4–6.

Each bar 50 has an airfoil configuration in cross section which is defined by a plurality of related curves developed as shown in Fig. 6. The leading and trailing edges 51 and 52 of the bar are both substantially semicylindrical about centers 53 and 54 respectively. A portion 55 along the outer surface of the bar and connecting with its leading edge 51 is cylindrically curved on the same radius as the inner surface of the screen 13 about a center 56, satisfactory results having been obtained with the angular extent of this surface portion 55 being approximately 5° where its radius is approximately 12 inches and the overall dimension of the bar from leading to trailing edge is approximately 4 inches. The center 54 of curvature of the trailing edge 52 lies on an arc 57 which is also drawn about the center 56, and the radius to the center of the arc 57 is indicated at 58. The center 53 of curvature of the leading edge 51 of the bar lies on an arc 59 which is also centered on the point 56 but is of smaller radius than the arc 57.

The portion 60 of the outer surface of the bar 50 located between its trailing edge 52 and the surface portion 55 is convexly curved about a radius 61 on a center 62 located angularly forwardly of the center radius 58 so that this surface portion 60 diverges toward the trailing edge of the bar from the rearward projection 55' of the surface 55 to leave a space 63 therebetween. The inner surface 65 of the bar is concavely curved about a radius 66 on a center 67 located angularly rearwardly of the center radius 58 to impart to the trailing portion of the bar the desired progressively decreasing thickness, and it will also be noted that this configuration and the mounting arrangement of the bar causes the entire trailing portion of the bar to lie within the rearward circumferential projection of its trailing edge 51.

As an example of other suitable dimensions for a bar 50 for use in screening apparatus as shown in Figs. 1–3 wherein the inner diameter of the screen 13 is approximately 24 inches, and the overall length of the bar in cross section is approximately 4 inches, satisfactory results have been obtained with the radii of the surface portions 60 and 65 respectively 8 and 6 inches, with the radius 58 and of arc 57 being ¾ inch less than the inner radius of the screen, and with the radii of the leading and trailing edges of the bar respectively ¾ inch and 3/16 inch. It will also be noted that each bar 50 as a whole is helically curved about the center 56, satisfactory results having been obtained with a lead angle for the helix of 10°22'. With the other dimensions of the bar as stated, this results in locating the upper end of the trailing edge of the bar and the lower end of the leading edge of the bar approximately in the same vertical line where the overall vertical dimension of the bar is 22.5 inches. The upper and lower ends of the bar are finished to lie in horizontal planes in use as shown.

Each bar 50 is mounted on the cage 44 by means of a pair of studs 70, each of which extends through a bore 71 located centrally between the leading and trailing edges of the bar and is riveted, welded, or otherwise secured to the bar. The two studs 70 are aligned in opposite sides of and in equi-spaced and parallel relation with a center line through the hub 44 as shown in Fig. 4, and they are secured in fixed relation with the cage by lock nuts 72, which at the same time provide for controlled adjustment of the studs to vary the positioning of the bar with respect to the screen 13.

In operation with a single pair of bars 50 mounted as shown on opposite sides of the cage 44, each bar is fixed on the cage with its surface portion 55 spaced radially inwardly from the screen by a predetermined small distance providing corresponding radial clearance therebetween, satisfactory results having been obtained with this clearance in the range of 0.030–0.060 inch. The cage 44 is rotated at substantially higher speeds than when contacting scraper blades are used as described in the above Staege patent, for example speeds of 200 to 350 R. P. M. depending upon the consistency of the stock and with the higher speeds used for higher consistency stocks.

As each bar rotates around the inner surface of the screen, its leading edge creates a positive pressure condition which reaches a maximum in the clearance between its surface portion 55 and the screen, thus tending to force the material in this clearance outwardly through the perforations in the screen. At the same time, a negative pressure condition is developed in the clearance 63 between the trailing edge portion of the bar and the screen which is effective to draw away from the surface of the screen large solid particles which would otherwise tend to remain in place and to clog the screen. As the bars continuously rotate around the screen, these positive and negative pressure conditions act as pressure waves rotating with the bar and thus continuously tending to force the good stock outwardly through the screen and to withdraw large particles away from the screen surface.

These withdrawn particles initially migrate towards the trailing edge of the bar, and then since the helical shape of the bar also induces a downward current condition along its trailing edge, they are urged gently downward within the supply chamber for ultimate removal through the discharge outlet 24. In addition, since the bars follow each other in relatively rapid succession, the solid particles which have been drawn inwardly by one bar are urged further inwardly by the force developed along the inner surface portion 65 of each bar, thus in effect adding a second inward pressure wave or current to the first negative pressure wave created along the surface 60 of the bars. This action therefore tends to prevent the reject particles from returning to the screen surface and further promotes their effective removal at the bottom of the unit. At the same time, the overall configuration of the bars has the desirable effect of tending to localize the several pressure waves as described without setting up undesirable conditions of turbulence within the unit.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a screening apparatus of the character described for screening fibrous material in liquid suspensions including a fixed vertically extending cylindrical perforate screen defining supply and discharge chambers respectively on the inner and outer sides thereof and having a rotary hub operable in said supply chamber, the combination of a bar having an airfoil configuration in cross section providing convex leading and trailing edge portions, means for mounting said bar in upwardly extending fixed relation with said hub for rotation therewith with respect to said screen, a portion of the outer surface of said bar adjacent said leading edge portion being cylindrically curved on substantially the same radius as said screen, the remainder of the outer surface of said bar being convexly curved about a shorter radius on a first center located to cause said convex surface to diverge from the rearward projection of said cylindrically curved surface, the inner surface of said bar being concavely curved about a second center located angularly to the rear of said first named center of curvature to impart to the trailing portion of said bar a progressively decreasing thickness, means for fixing said bar on said hub with said cylindrically curved outer surface portion thereof spaced radially inwardly from said screen by a predetermined small distance providing a corresponding small radial clearance therebetween, means for rotating said hub with respect to said screen to create a positive pressure wave along said leading edge of said bar tending to force said material outwardly through said screen and followed by a negative pressure wave between said screen and said trailing edge portion of said bar tending to draw solid particles inwardly from the surface of said screen for downward movement along said trailing edge of said bar, and means forming a discharge outlet at the bottom of said supply chamber for receiving and discharging said rejected solid particles.

2. In a screening apparatus of the character described for screening fibrous material in liquid suspensions including a fixed vertically extending cylindrical perforate screen defining supply and discharge chambers respectively on the inner and outer sides thereof and having a rotary hub operable in said supply chamber, the combination of a bar having an airfoil configuration in cross section providing convex leading and trailing edge portions, means for mounting said bar in upwardly extending fixed relation with said hub for rotation therewith with respect to said screen, a portion of the outer surface of said bar adjacent said leading edge portion being cylindrically curved on substantially the same radius as said screen, the remainder of the outer surface of said bar being convexly curved about a shorter radius on a first center located to cause said convex surface to diverge from the rearward projection of said cylindrically curved surface, the inner surface of said bar being concavely curved about a second center located angularly to the rear of said first named center of curvature to impart to the trailing portion of said bar a progressively decreasing thickness, means for fixing said bar on said hub with said cylindrically curved outer surface portion thereof spaced radially inwardly from said screen by a predetermined small distance providing a corresponding small radial clearance therebetween, means for rotating said hub with respect to said screen to create a positive pressure wave along said leading edge of said bar tending to force said material outwardly through said screen and followed by a negative pressure wave between said screen and said trailing edge portion of said bar tending to draw solid particles inwardly from the surface of said screen, said bar being of generally helical configuration with the upper end thereof being the leading end with respect to the remainder thereof to cause said particles to travel downwardly along said trailing edge of said bar, and means forming a discharge outlet at the bottom of said supply chamber for receiving and discharging said rejected solid particles.

3. A bar for use in screening apparatus of the character described for screening fibrous material in liquid suspensions including a fixed vertically extending cylindrical perforate screen defining supply and discharge chambers respectively on the inner and outer sides thereof and having a rotary hub operable in said supply chamber, said bar having an airfoil configuration in cross section providing a semi-cylindrical leading edge portion, means for mounting said bar in upwardly extending fixed relation with said hub for rotation therewith with respect to said screen, a portion of the outer surface of said bar adjacent said leading edge portion being cylindrically curved on substantially the same radius as said screen, the remainder of the outer surface of said bar being convexly curved about a shorter radius on a first center located to cause said convex surface to diverge from the rearward projection of said cylindrically curved surface, the inner surface of said bar being concavely curved about a second center located angularly to the rear of said first named center of curvature to impart to the trailing portion of said bar a progressively decreasing thickness, and the trailing edge portion of said bar being cylindrically curved about a short radius to form a smooth connection between said convex and concave surface portions.

4. A bar for use in screening apparatus of the character described for screening fibrous material in liquid suspensions including a fixed vertically extending cylindrical perforate screen defining supply and discharge chambers respectively on the inner and outer sides thereof and having a rotary hub operable in said supply chamber, said bar having an airfoil configuration in cross section providing a substantially semi-cylindrical leading edge portion, means for mounting said bar in upwardly extending fixed relation with said hub for rotation therewith with respect to said screen, a portion of the outer surface of said bar adjacent said leading edge portion being cylindrically curved on substantially the same radius as said screen, the remainder of the outer surface of said bar being convexly curved about a shorter radius on a first center located to cause said convex surface to diverge from the rearward projection of said cylindrically curved surface, the inner surface of said bar being concavely curved about a second center located angularly to the rear of said of said first named center to impart to the trailing portion of said bar a progressively decreasing thickness, the trailing edge portion of said bar being cylindrically curved about a short radius to form a smooth connection between said convex and concave surface portions, and said bar as a whole being helically curved while maintaining in cross section substantially the relationships of said curved surfaces thereof as defined hereinbefore.

5. A bar for use in a screening apparatus of the character described for screening fibrous material in liquid suspensions including a fixed vertically extending cylindrical perforate screen defining supply and discharge chambers respectively on the inner and outer sides thereof and having a rotary hub operable in said supply chamber, said bar having an airfoil configuration in cross section providing substantially semi-cylindrical leading and trailing edge portions of relatively large and small radius respectively, means for mounting said bar in upwardly extending fixed relation with said hub for rotation therewith with respect to said screen and with an arc concentric with and of smaller radius than said screen substantially bisecting said trailing edge portion of said bar, a portion of the outer surface of said bar adjacent said leading edge portion being cylindrically curved concentrically with and on a larger radius than said arc, the remainder of the outer surface of said bar being convexly curved about a shorter radius on a center located angularly forwardly of the central radius of said arc to cause said convex surface to diverge from the rearward projection of said cylindrically curved surface, and the inner surface of said bar being concavely curved about a center located angularly to the rear of said central radius of said arc to impart to the trailing portion of said bar a progressively decreasing thickness and to provide a substantially greater proportion of said leading edge portion inwardly of said arc than outwardly thereof.

6. A bar for use in apparatus of the character described for screening fibrous material in liquid suspensions including a fixed cylindrically curved perforate screen defining supply and discharge chambers respectively on the concave and convex sides thereof and having a rotary hub operable in said supply chamber, said bar being adapted for mounting on said hub for rotation therewith with the outer surface of said bar in radially fixed relation with said screen, a portion of said outer surface of said bar adjacent one edge thereof being cylindrically curved on substantially the same radius as said screen, said edge portion of said bar adjacent said outer surface portion being cylindrically curved on a substantially shorter radius to form the leading edge of said bar, the remainder of the outer surface of said bar being convexly curved about a shorter radius than the radius of said screen on a center located to cause said convex surface to diverge from the rearward projection of said cylindrically curved surface, the radially inner surface of said bar being concavely curved about a second center located to impart to the trailing portion of said bar a progressively decreasing thickness, and the trailing edge portion of said bar being curved about a short radius to form a smooth connection between said convex and concave surface portions.

7. A bar for use in apparatus of the character described for screening fibrous material in liquid suspensions including a fixed cylindrically curved perforate screen defining supply and discharge chambers respectively on the concave and convex sides thereof and having a rotary hub operable in said supply chamber, said bar being adapted for mounting on said hub for rotation therewith with the outer surface of said bar in radially fixed relation with said screen, a portion of said outer surface of said bar adjacent one edge thereof being cylindrically curved on substantially the same radius as said screen, said edge portion of said bar adjacent said outer surface portion being cylindrically curved on a substantially shorter radius to form the leading edge of said bar, the remainder of the outer surface of said bar being convexly curved about a center located to cause said convex surface to diverge from the rearward projection of said cylindrically curved surface, the radially inner surface of said bar being concavely curved about a second center located to impart to the trailing portion of said bar a progressively decreasing thickness, and the trailing edge portion of said bar being curved about a short radius to form a smooth connection between said convex and concave surface portions.

8. A bar for use in apparatus of the character described for screening fibrous material in liquid suspensions including a fixed cylindrically curved perforate screen defining supply and discharge chambers respectively on the concave and convex sides thereof and having a rotary hub operable in said supply chamber, said bar being adapted for mounting on said hub for rotation therewith with the outer surface of said bar in radially fixed relation with said screen, said bar having partially cylindrically curved leading and trailing edges of respectively larger and smaller radii, the portion of said outer surface of said bar adjacent said leading edge being cylindrically curved on substantially the same radius as said screen, said leading edge being curved on a substantially shorter radius than said screen to diverge from the forward projection of said cylindrically curved portion, the remainder of the outer surface of said bar being convexly curved about a center located to cause said convex surface to diverge from the rearward projection of said cylindrically curved surface, the radially inner surface of said bar being constructed to impart to the trailing portion of said bar a progressively decreasing thickness, and said bar as a whole being helically curved while maintaining in cross section substantially the relationships of said surface and edge portions thereof defined hereinabove.

9. Apparatus of the character described for screening fibrous material in liquid suspension comprising a casing, a cylindrically curved perforate screen fixed within said casing, means cooperating with said screen to define supply and discharge chambers respectively on the concave and convex sides of said screen, a rotary hub operable in said supply chamber on an axis concentric with said screen, a bar carried by said hub for rotation therewith and extending lengthwise of said screen to provide leading and trailing edges thereon, means securing said bar to said hub with a portion of the radially outer surface of said bar adjacent said leading edge thereof in fixed closely spaced relation with the inner surface of said screen providing a predetermined small radial clearance therebetween, said leading edge of said bar being curved about a relatively short radius to diverge relatively rapidly from said screen in advance of said clearance, the remainder of the outer surface of said bar adjacent said clearance being convexly curved on a substantially longer radius than said leading edge about a center located to cause said convex surface to diverge relatively slowly from said screen behind said clearance, the radially inner surface of said bar being constructed to impart to the trailing portion of said bar a progressively decreasing thickness, said bar as a whole being of such configuration and mounting on said hub that the entire trailing portion thereof lies within the rearward circumferential projection of the leading edge thereof, and means for rotating said hub to drive said bars through the suspension within said supply chamber and thereby to create a positive pressure wave along said leading edge of said bar tending to force said material outwardly through said screen and followed by a negative pressure wave between said screen and said trailing edge of said bar tending to draw solid particles inwardly from the surface of said screen.

10. Apparatus of the character described for screening fibrous material in liquid suspension comprising a casing, a cylindrically curved perforate screen fixed within said casing, means cooperating with said screen to define supply and discharge chambers respectively on the concave and convex sides of said screen, a rotary hub operable in said supply chamber on an axis concentric with said screen, a bar carried by said hub for rotation therewith and extending lengthwise of said screen to provide leading and trailing edges thereon, a portion of the radially outer surface of said bar adjacent said leading edge thereof being cylindrically curved on substantially the same radius as the inner surface of said screen, means securing said bar to said hub with said cylindrically curved portion thereof in fixed closely spaced relation with the inner surface of said screen providing a predetermined small radial clearance therebetween, said leading edge of said bar being curved about a relatively short radius to diverge from said screen in advance of said clearance, the remainder of the outer surface of said bar adjacent said clearance being convexly curved on a radius and center located to cause said convex surface to diverge relatively gradually from said screen behind said clearance, and the radially inner surface of said bar being curved on a radius and center located to impart to the trailing portion of said bar a progressively decreasing thickness.

11. Apparatus of the character described for screening fibrous material in liquid suspension comprising a casing, a cylindrically curved perforate screen fixed in upright position within said casing, means cooperating with said screen to define supply and discharge chambers respectively on the concave and convex sides of said screen, a rotary hub operable in said supply chamber on an upright axis concentric with said screen, a bar carried by said hub for rotation therewith and extending lengthwise of said screen to provide leading and trailing edges thereon, means securing said bar to said hub with a portion of the radially outer surface of said bar adjacent said leading edge thereof in fixed closely spaced relation with the inner surface of said screen providing a predetermined small radial clearance therebetween, said leading edge of said bar being curved about a relatively short radius to diverge from said screen in advance of said clearance, the remainder of the outer surface of said bar adjacent said clearance being convexly curved on a radius and center located to cause said convex surface to diverge relatively gradually from said screen behind said clearance, the radially inner surface of said bar being concavely curved on a radius and center located to impart to the trailing portion of said bar a progressively decreasing thickness, said bar as a whole being helically curved from end to end thereof while maintaining in cross section substantially the relationships of said surface and edge portions thereof defined hereinabove, means for rotating said hub to drive said bars through the suspension within said supply chamber and thereby to create a positive pressure wave along said leading edge of said bar tending to force said material outwardly through said screen and followed by a negative pressure wave between said screen and said trailing edge of said bar tending to draw solid particles inwardly from the surface of said screen and to cause said particles to travel downwardly along said trailing edge of said bar, and means forming a discharge outlet at the bottom of said supply chamber for receiving and discharging said rejected solid particles.

References Cited in the file of this patent

UNITED STATES PATENTS

| 1,932,663 | Haug | Oct. 31, 1933 |
| 2,230,647 | Knight | Feb. 4, 1941 |
| 2,289,612 | Wells | July 14, 1942 |
| 2,347,716 | Staege | May 2, 1944 |

FOREIGN PATENTS

| 464,660 | France | Jan. 19, 1914 |